L. ROBICHON.
WATER CONTAINING VESSEL FOR PRESERVING FRUITS AND VEGETABLES.
APPLICATION FILED JAN. 24, 1916.
1,360,024. Patented Nov. 23, 1920.
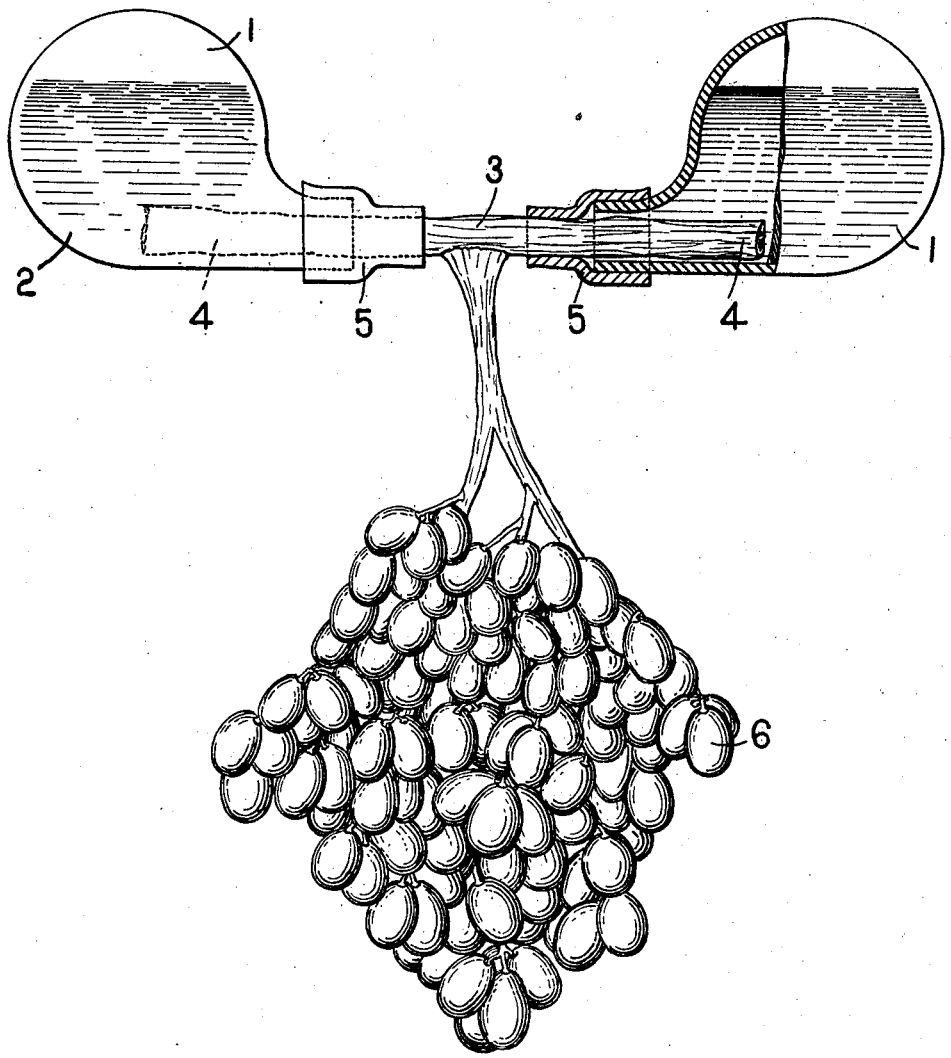
L. Robichon.
Inventor.
By Albert E. Parker
Attorney.

UNITED STATES PATENT OFFICE.

LUIS ROBICHON, OF MENDOZA, ARGENTINA.

WATER-CONTAINING VESSEL FOR PRESERVING FRUITS AND VEGETABLES.

1,360,024.   Specification of Letters Patent.   Patented Nov. 23, 1920.

Application filed January 24, 1916. Serial No. 73,991.

*To all whom it may concern:*

Be it known that I, LUIS ROBICHON, a citizen of the Argentine Republic, residing at the city of Mendoza, Province of Mendoza, Argentine Republic, have invented certain new and useful Water-Containing Vessels for Preserving Fruits and Vegetables, of which the following is a specification.

The present invention relates to a new process which has for its object the preservation of fruit and vegetables, and more particularly grapes in their fresh state, which can at a minimum, be preserved under those conditions for a period of six or more months, if so desired.

The process in question is of great simplicity, as same consists of the principle of utilizing pure water as the preserving agent or medium, *i. e.* proportioning the water, the nourishment necessary to the life of the grape, when the latter is already mature. In practice, I take a vineshoot, the two ends of which I introduce into bobbins or similar vessels filled with water, which are connected to the vineshoot by means of a socket or suitable portion of rubber, which prevents the water from leaving the bobbin through the outer covering or bark of the vineshoot. Under these conditions, the water solely penetrates through the cut ends of the vineshoot, the quantity of such water in the bobbin varying in accordance with the period of time which may be indispensable for maintaining the grapes in a fresh state.

In order that this invention may be more clearly understood, and readily carried into effect, I will proceed to describe same more fully with reference to the accompanying drawing, showing the disposition of a vineshoot in the aforementioned conditions, in which drawing, 1 represents the bobbins or vessels which may be of the type shown or of any other suitable for the purpose; 2 is the water contained in same; 3 is the vineshoot whose ends 4 are shown within the water in the interior of the bobbins; 5 is the rubber socket, which partly presses against the mouth of the bobbin and partly against the vineshoot.

As will be readily understood from the aforementioned details, I take the vineshoot 3 and cut same at its ends 4, and each of these I introduce into the bobbins or vessels 1 which are filled with water, the socket having already been attached to the extremity of the bobbin 1, and in this condition by means of a small cord or chain the whole is suspended in such a manner so that the vineshoot occupies a horizontal position from which the bunch of grapes hangs down as shown in the drawing.

As will be seen the invention is very simple, and claims to have found efficient means for the preservation of fruit and vegetables, and more particularly of grapes in a fresh state; the cost of such means are relatively small and their manipulation easily performed and without difficulties, so that the enumerated circumstances constitute a progress in the fruit and vegetable industry of undisputable merit. The size and shape of the bobbins employed may be varied, as it must be understood that the invention is not limited to such size and form, because it may be embodied in a multiplicity of forms, each being a species of said invention; the material utilized in their construction may be any suitable, although it is preferable to use transparent glass.

On the other hand the fruit and vegetables preserved in this form, may remain stored in a fixed spot or it may be transported from one place to another in wagons, ships, etc., with the objects of exportation, in which case the advantages resulting from the use of this invention will be readily appreciated.

Having fully described my invention what I claim as new and desire to secure by Letters Patent, is—

1. A water containing vessel for use in the preservation of fruit and vegetables, comprising a main portion for containing the water, and a reduced mouth portion into which the stem of the fruit is inserted, and an elastic socket member carried by said mouth portion and extending axially along the stem and gripping the same.

2. A device for use in the preservation of fruit and vegetables comprising a rigid impervious chamber for containing water, a neck extending laterally from the bottom of the chamber and adapted to receive the stem of the fruit or vegetables and a socket member fitting the neck and stem water tight whereby practically all the water in the vessel is maintained above the stem.

3. A device for use in the preservation of fruit and vegetables comprising a rigid impervious chamber for containing water, a neck extending laterally from the bottom of the chamber and adapted to receive the stem of the fruit or vegetables and an elastic tube fitting over the neck and stem water tight whereby practically all the water in the vessel is maintained above the stem.

4. The combination with a double ended fruit stem carrying an article of fruit, of a plurality of impervious water containing vessels having necks through which the ends of the stem extends and are immersed in the water, and elastic socket members carried by said necks, extending axially along the stem, and gripping said stem to prevent leakage of the water between the stem and said necks.

In testimony whereof I have signed my name to this specification in the presence of two subscribing witnesses.

LUIS ROBICHON.

Witnesses:
E. BONOTER,
ANNA S. GRIMES.